United States Patent
Eagles

(10) Patent No.: US 8,647,474 B2
(45) Date of Patent: Feb. 11, 2014

(54) PROCESS FOR PRODUCING PAPERMAKER'S AND INDUSTRIAL FABRIC SEAM AND SEAM PRODUCED BY THAT METHOD

(75) Inventor: Dana Eagles, Sherborn, MA (US)

(73) Assignee: Albany International Corp, Albany, NY (US)

( * ) Notice: Subject to any disclaimer, the term of this patent is extended or adjusted under 35 U.S.C. 154(b) by 133 days.

(21) Appl. No.: 13/274,878

(22) Filed: Oct. 17, 2011

(65) Prior Publication Data
US 2012/0031554 A1    Feb. 9, 2012

Related U.S. Application Data

(62) Division of application No. 12/231,669, filed on Sep. 4, 2008, now Pat. No. 8,062,480.

(60) Provisional application No. 60/967,489, filed on Sep. 5, 2007.

(51) Int. Cl.
    D21F 7/10      (2006.01)
    D21F 1/10      (2006.01)
    D21F 7/08      (2006.01)
    D21F 7/12      (2006.01)
    B29C 65/16     (2006.01)

(52) U.S. Cl.
    USPC ........ 162/348; 162/358.2; 162/900; 162/902; 162/903; 162/904; 156/272.8; 156/304.6; 428/58; 28/141

(58) Field of Classification Search
    USPC .................. 162/348, 358.2, 900, 902–904; 139/383 AA, 383 A, 383 R, 425 A; 156/304.1, 304.6, 272.8; 428/57, 58; 28/110, 142
    See application file for complete search history.

(56) References Cited

U.S. PATENT DOCUMENTS 3,973,064 A    8/1976  Paine
4,032,382 A    6/1977  Obeda
(Continued)

FOREIGN PATENT DOCUMENTS

CA          2552009        2/2007
CA      CA 2 552 009 A     2/2007
(Continued)

OTHER PUBLICATIONS

International Search Report and Written Opinion issued by European Patent Office for International Application PCT/US2008/074388, mailed Jan. 1, 2009 (corresponding to U.S. Appl. No. 11/899,232).

(Continued)

*Primary Examiner* — Eric Hug
(74) *Attorney, Agent, or Firm* — Frommer Lawrence & Haug LLP; Ronald R Santucci

(57) ABSTRACT

The invention disclosed herein relates to the use of laser energy to weld or melt selected locations in papermachine clothing ("PMC") and other industrial and engineered fabrics. The invention also relates to an improved seam for a papermaker or other industrial fabric that has properties such as strength, durability, openness, adequate number of support points, and fiber support index (FSI) essentially the same as the fabric body. The invention also relates to a fabric having a durable seam, wherein the seam width as measured in the MD is a fraction of the width of a normal seam or a seam that is formed using a conventional technique of equal strength.

14 Claims, 13 Drawing Sheets

(56) References Cited

U.S. PATENT DOCUMENTS

| | | | |
|---|---|---|---|
| 4,156,626 A | 5/1979 | Souder | |
| 4,401,137 A | 8/1983 | Cannon | |
| 4,501,782 A | 2/1985 | Weatherly et al. | |
| 4,664,738 A * | 5/1987 | Tadros | 156/275.1 |
| 4,701,229 A | 10/1987 | Arakawa et al. | |
| 4,906,320 A | 3/1990 | Powers | |
| 4,943,476 A | 7/1990 | Sokaris | |
| 5,170,031 A | 12/1992 | Russell et al. | |
| 5,204,150 A | 4/1993 | Davenport | |
| 5,334,289 A | 8/1994 | Trokhan et al. | |
| 5,348,604 A * | 9/1994 | Neff | 156/272.8 |
| 5,391,419 A | 2/1995 | Davenport | |
| 5,464,488 A | 11/1995 | Servin | |
| 5,501,759 A | 3/1996 | Forman | |
| 5,554,467 A | 9/1996 | Trokhan et al. | |
| 5,571,590 A | 11/1996 | Schultz et al. | |
| 5,624,790 A | 4/1997 | Trokhan et al. | |
| 5,670,230 A | 9/1997 | Schlueter, Jr. et al. | |
| 5,674,663 A | 10/1997 | McFarland et al. | |
| 5,686,639 A | 11/1997 | Cohen | |
| 5,693,187 A | 12/1997 | Ampulski et al. | |
| 5,711,847 A | 1/1998 | Rajala et al. | |
| 5,713,399 A | 2/1998 | Collette et al. | |
| 5,721,032 A | 2/1998 | Parker et al. | |
| 5,731,063 A | 3/1998 | Schultz et al. | |
| 5,740,314 A | 4/1998 | Grimm | |
| 5,783,377 A | 7/1998 | Mee et al. | |
| 5,837,103 A | 11/1998 | Trokhan et al. | |
| 5,840,147 A | 11/1998 | Grimm | |
| 5,843,265 A | 12/1998 | Grimm | |
| 5,871,887 A | 2/1999 | Trokhan et al. | |
| 5,888,915 A | 3/1999 | Denton et al. | |
| 5,939,176 A | 8/1999 | Yook | |
| 6,099,670 A | 8/2000 | Louks et al. | |
| 6,162,518 A | 12/2000 | Korfer | |
| 6,491,794 B2 | 12/2002 | Davenport | |
| 6,517,650 B2 | 2/2003 | Couillard et al. | |
| 6,547,903 B1 | 4/2003 | McNichols et al. | |
| 6,547,904 B1 | 4/2003 | Young | |
| 6,656,315 B2 | 12/2003 | Sallavanti et al. | |
| 6,702,927 B2 | 3/2004 | Moriarty et al. | |
| 6,763,855 B2 | 7/2004 | Rougvie | |
| 6,896,771 B2 | 5/2005 | Best et al. | |
| 7,220,340 B2 | 5/2007 | Best | |
| 7,381,307 B2 | 6/2008 | Silakoski | |
| 7,384,513 B2 | 6/2008 | Eagles | |
| 7,393,434 B2 | 7/2008 | Kornett | |
| 7,794,555 B2 * | 9/2010 | LaFond et al. | 156/64 |
| 8,088,256 B2 * | 1/2012 | Hansen et al. | 162/348 |
| 2003/0221739 A1 | 12/2003 | Billings | |
| 2004/0007281 A1 * | 1/2004 | Best | 139/383 A |
| 2004/0056006 A1 * | 3/2004 | Jones et al. | 219/121.64 |
| 2004/0126569 A1 | 7/2004 | Davenport et al. | |
| 2005/0041893 A1 * | 2/2005 | Hartmann et al. | 383/107 |
| 2005/0102763 A1 | 5/2005 | Eagles | |
| 2005/0181168 A1 * | 8/2005 | Barnes et al. | 428/57 |
| 2006/0016571 A1 * | 1/2006 | Silakoski | 162/358.2 |
| 2007/0028997 A1 * | 2/2007 | Best et al. | 139/383 R |
| 2007/0235155 A1 * | 10/2007 | Best et al. | 162/358.2 |

FOREIGN PATENT DOCUMENTS

| | | |
|---|---|---|
| DE | 39 21 712 C | 9/1990 |
| DE | 20 2006 004 624 U1 | 7/2006 |
| EP | 0 947 623 A | 10/1999 |
| FR | 2 874 188 A | 2/2006 |
| GB | 2232637 | 12/1990 |
| JP | 09-207223 | 8/1997 |
| JP | 2005-279990 | * 10/2005 |
| WO | WO 96/40517 A | 12/1996 |
| WO | WO 99/16964 A | 4/1999 |
| WO | WO 99/53237 A | 10/1999 |
| WO | WO 00/02723 A | 1/2000 |
| WO | WO 01/58997 A | 8/2001 |
| WO | WO 02/38677 A | 5/2002 |
| WO | WO 02/057353 | 7/2002 |
| WO | WO 02/057353 A | 7/2002 |
| WO | WO 2004/055265 A | 7/2004 |
| WO | WO 2006/074105 A | 7/2006 |

OTHER PUBLICATIONS

International Search Report and Written Opinion issued by European Patent Office for International Application PCT/US2008/074312, mailed Mar. 10, 2009 (corresponding to U.S. Appl. No. 11/899,245).

Clear weld "The Concept" and Clearweld "The Clear Advantage, Clearweld Material Systems", pages from website www.clearweld.com (3 pages in total), Jul. 14, 2003.

IPAC "Near, Mid & Far Infrared" pages from website www.ipac.caltech.edu (5 pages in total), Jul. 14, 2003.

Backmann, Reinhard: "Textilschweißen—Thermisches Fügen und Verbinden von Textilien für Orthopädie—und Medizintechnik", Jan. 2004, retrieved from the Internet URL:http://www.grin.com/e-book/111374/textilschweissen-thermisches-fuegen-und-verbinden-von-textilien-fuer-orthopaedie, (retrieved on Nov. 10, 2008), total 21 pages (in German).

Anonymous: "High Frequency Technology", Aug. 10, 2003, retrieved from the Internet URL:http://web.archive.org/web/20030810015427/http://rfwelding.com/hpage07.htm, (retrieved on Nov. 10, 2008), total 5 pages (in English).

"Schneiden Schweissen und Siegeln Mittels Utraschall-Beruehrungslos und Verschleissfrei", *Deutscher Drucker*, 31 Sep. 21, 1995, No. 35, p. G29 (in German).

* cited by examiner

F I G. 3
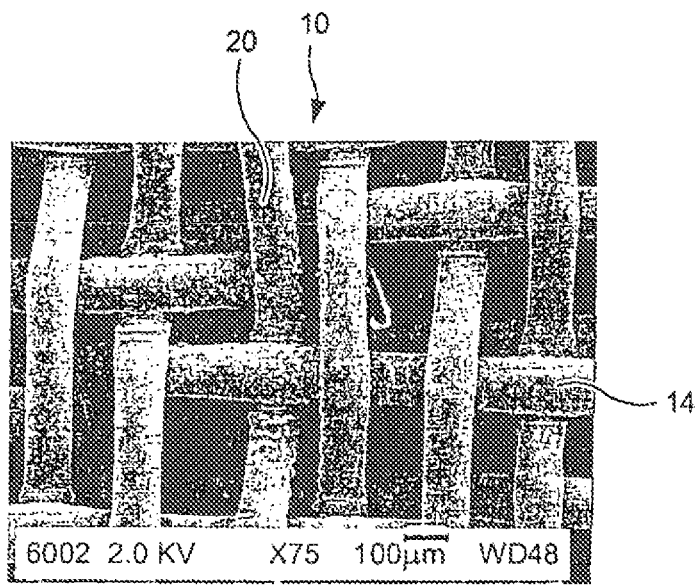
F I G. 4(a)
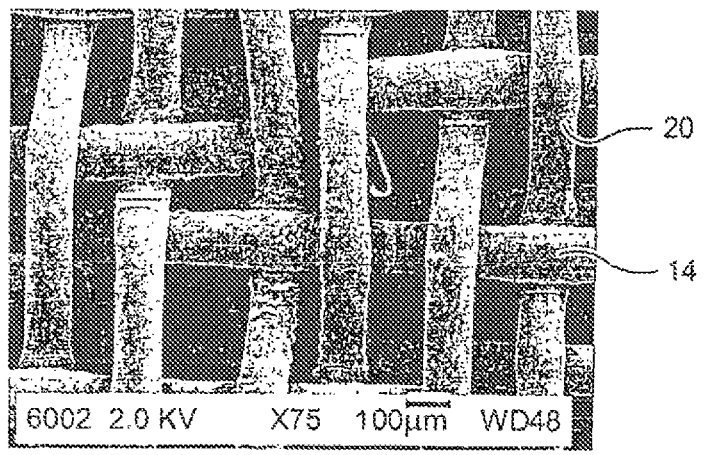

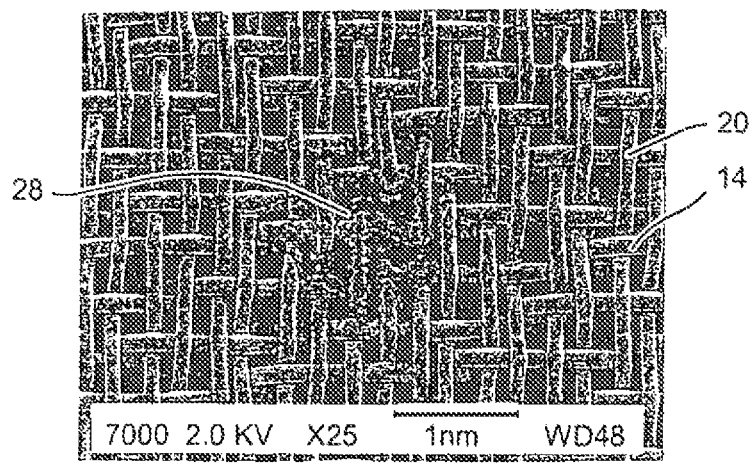
F I G. 4(b)
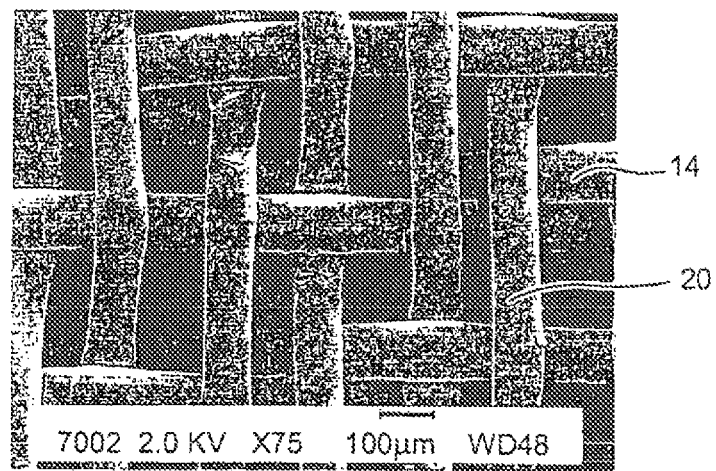
F I G. 4(c)

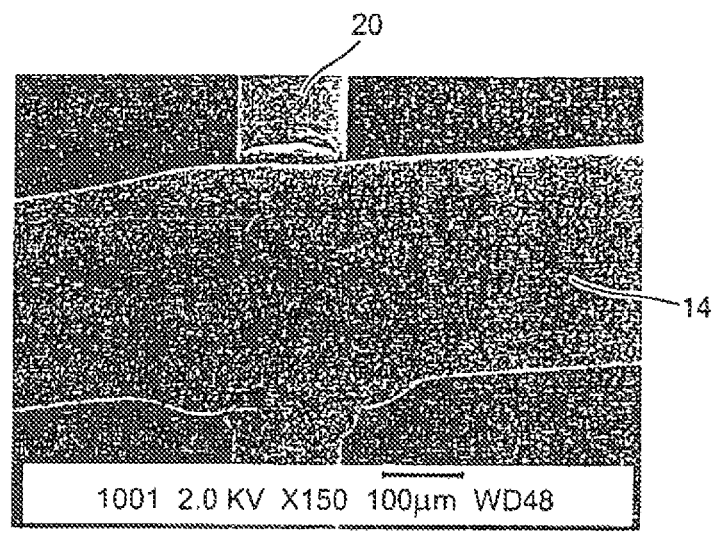
F I G. 4(d)
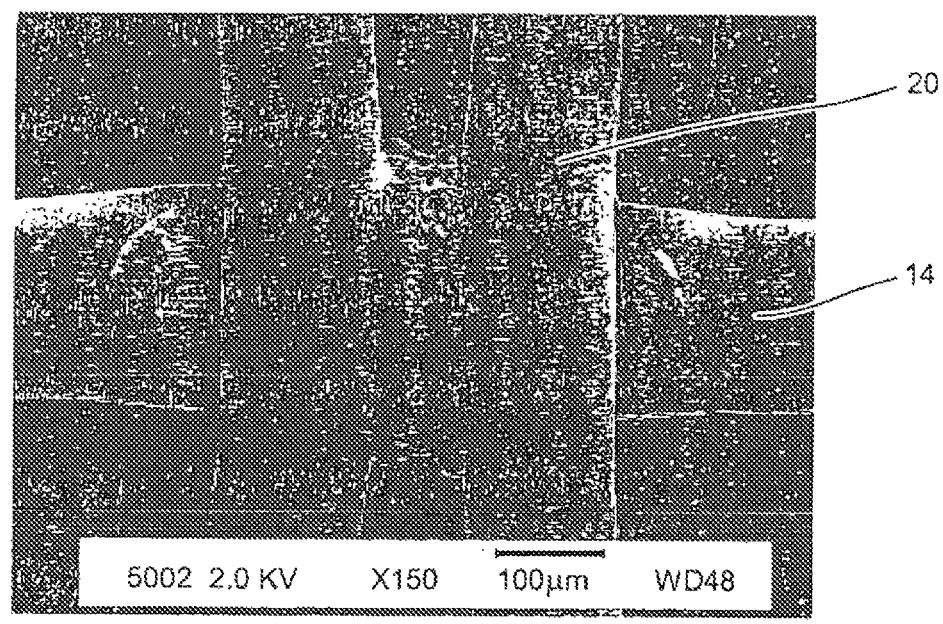
F I G. 4(e)

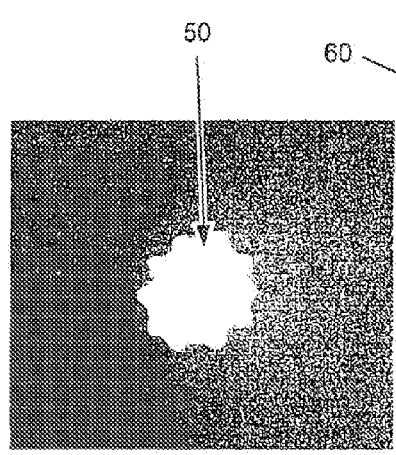
F I G. 13(a)
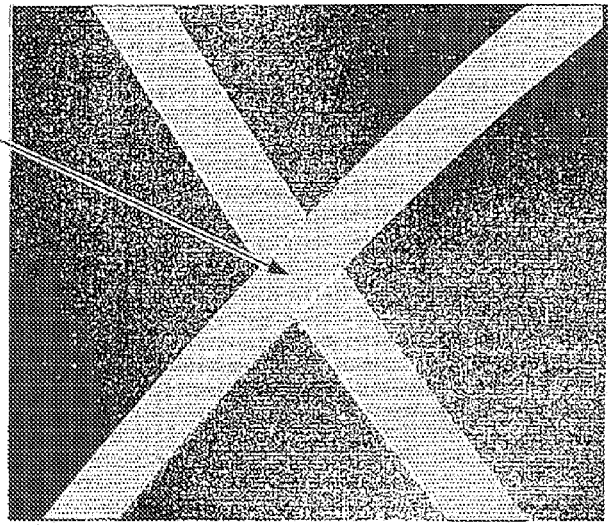
F I G. 13(b)
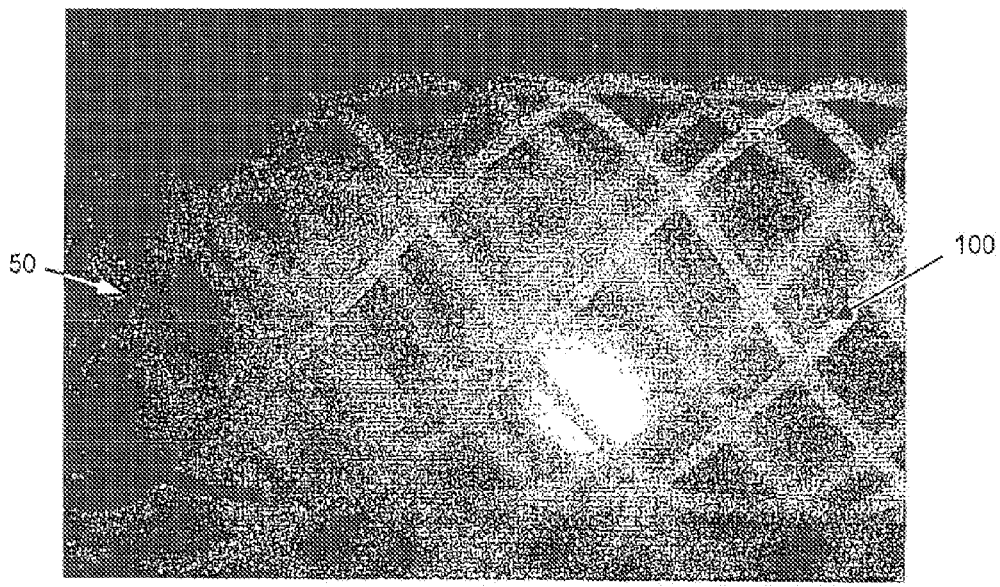
F I G. 13(c)

PROCESS FOR PRODUCING PAPERMAKER'S AND INDUSTRIAL FABRIC SEAM AND SEAM PRODUCED BY THAT METHOD

This application is a division of U.S. patent application Ser. No. 12/231,669 filed Sep. 4, 2008, now U.S. Pat. No. 8,062,480, which claims priority benefits of U.S. Provisional Patent Application Ser. No. 60/967,489 filed Sep. 5, 2007, the disclosures of both are incorporated herein by reference.

FIELD OF THE INVENTION

The invention disclosed herein relates to the use of laser energy to weld or fuse selected locations in papermachine clothing ("PMC") and other industrial and engineered fabrics.

INCORPORATION BY REFERENCE

All patents, patent applications, documents and/or references referred to herein are incorporated by reference, and may be employed in the practice of the invention.

BACKGROUND OF THE INVENTION

The present invention relates to the papermaking arts including fabrics and belts used in the forming, pressing, and drying sections of a paper machine, and to industrial process fabrics and belts, TAD fabrics, engineered fabrics and belts, along with corrugator belts generally.

The fabrics and belts referred to herein may include those also used in the production of, among other things, wetlaid products such as paper and paper board, and sanitary tissue and towel products made by through-air drying processes; corrugator belts used to manufacture corrugated paper board and engineered fabrics used in the production of wetlaid and drylaid pulp; in processes related to papermaking such as those using sludge filters and chemiwashers; and in the production of nonwovens produced by hydroentangling (wet process), meltblowing, spunbonding, airlaid or needle punching. Such fabrics and belts include, but are not limited to: embossing, conveying, and support fabrics and belts used in processes for producing nonwovens; filtration fabrics and filtration cloths; and fabrics and belts used for textile finishing processes such as calendering and hide tanning.

Such belts and fabrics are subject to a wide variety of conditions for which functional characteristics need to be accounted. For example, during the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

It should be appreciated that these industrial fabrics such as paper machine clothing (PMC) such as the forming fabrics, press fabrics, and dryer fabrics, all take the form of endless loops on the paper machine and function in the manner of conveyers.

Such fabric structures are typically constructed from synthetic fibers and monofilaments by conventional textile processing methods such as weaving, for example. It is often desirable to selectively tailor the fabric structure to affect or enhance a performance characteristic important to, for example, the papermaker, such as fabric life, sheet formation, runnability or paper properties.

For fabrics such as those used for the forming of paper and tissue products, or for the production of tissue/towel or through-air drying "TAD" fabrics, such fabrics are often times joined by a seam. In this instance, the fabric is usually flat woven from yarns, usually monofilaments. Each fabric edge has a "fringe" of machine direction ("MD") yarns. This fringe is rewoven with cross machine direction ("CD") yarns in the same basic pattern as the fabric body. This process of seaming to make endless is known to those skilled in the art. The seam area therefore contains MD yarn ends. The strength of the seam is dependent upon the MD yarn strength, the number of MD and CD yarns used, and the crimp in the MD yarns themselves that physically "lock" themselves around CD yarns to an extent. However, when the fabric is under operating tension on, for example, a papermaking or tissue/towel making machine, these MD yarn ends can literally slip past one another and pull out. The "ends" themselves can protrude above the fabric plane causing small holes in the paper/tissue product or can eventually slip enough so that ultimately, the fabric seam fails and the fabric pulls apart. Typically, the width of the seam area, as measure in MD, formed using conventional techniques range, for example, anywhere between three and one half to twenty inches or even more.

To minimize this, the yarns in the seam are usually sprayed or coated with an adhesive. Unfortunately, this can alter the fluid handling properties of the seam area, and the adhesive can also be abraded and wear off.

While the application of heat to partially weld or fuse yarns to each other in the seam area has been contemplated, the use of heat generally may cause unacceptable change to the fluid handling properties of the seam area since all yarns are affected and the seam may, for example, have a resultant air permeability different than the fabric body.

Other shortcomings of the prior attempts are that either because of the number of yarns used in the MD, or the size of the yarns used, sufficient seam strength cannot be obtained by conventional seaming methods, even with the additional use of glues/adhesives.

It is known in the paper machine clothing and/or industrial fabric arts to utilize thermal energy to fuse yarns together to form a seam in for example, a flat woven fabric of machine direction (MD) and cross machine (CD) yarns.

The need to maintain yarn properties as well as fabric properties in the seam area is paramount. Yarns used in PMC and other industrial fabrics are made from oriented polymers such as polyester, and have a desired shape and size. It is necessary to maintain essentially the yarn size, shape and characteristics after application of thermal energy. However, heat can affect these materials in a variety of adverse ways. For example, heat can cause (a) softening above the glass transition point of a thermoplastic material which effects dimensional changes, or (b) flow by melting above the melt transition point.

Seam openness should be maintained by not causing major distortion of the yarns in the seam area. Also, high yarn tensile strength, especially in the MD yarns should be maintained or resultant seam strength will be unacceptable.

While some "melt flow" is required to have at least portions of two adjacent yarns bond to each other and/or bond to CD yarns that they crossover, no major distortion of the yarn should occur. So there is a need to balance the desired yarn, seam and fabric properties compared to the amount and location of the absorbed thermal energy as exemplified in FIG. 1.

Thermal welding of polymers is achieved by either overlapping of the two MD yarns, for example, to be welded together by some distance, or end to end welding of two yarns, or either of these in conjunction with fusion to a yarn oriented in another direction in the fabric, for example, at least one CD yarn. Welding can also occur with just one MD yarn welded to a CD yarn at a crossover.

There have been attempts to use lasers to weld thermoplastic materials together, but "weld quality" and over-fusing of the material was suspect. Such "over-fusing" would be unacceptable for the yarns used in the fabric applications envisioned.

Laser technology has advanced, producing laser types that would better control and focus the thermal energy.

A further development based upon the principles of transmission (some laser wavelengths are transparent to polymeric materials, such as polyester for example polyethylene terephthalate (PET) and polyamide (PA)) and absorption is to use a radiation absorbing material within a polymer matrix or applying it to for example, a polymeric yarn surface in a discrete location where thermal fusion or welding is desired. US Patent Application US2004/0056006A1 assigned to The Welding Institute, exemplifies such technology. However, nothing in this application addresses the needs of using a similar approach on adjacent yarns for example in the seam of a forming or other industrial fabric.

Another example of using laser energy and an energy absorbing material is taught in PCT Application WO02/057353A2 assigned to EI Dupont De Numours and Company. Again however, the teachings are for bonding materials shaped by injection molding and do not address the requirements of producing fabrics and improved seams in such fabrics when using oriented polymeric yarns.

Canadian patent application 2,552,009, assigned to Heimbach GMBH & Co., KG relates to a forming fabric for use in a sheet forming section of a papermachine, having or comprising a textile planar structure in which, in order to enhance inherent stability, intersecting yarns are engaged into one another at intersection points and in which yarns additionally are fused to one another, which is characterized in that the planar structure comprises intersecting first and second yarns, the first yarns having the property that they absorb laser energy and can be brought by absorbed laser energy, to melting temperatures at least at the surface; and that first and second yarns are fused to one another at least at some of their intersection points.

The application teaches that one of the two yarns contains a laser energy absorbing material. Further, when addressing the seam area of a woven fabric, the application teaches that in the seam region, first yarns (that contain the laser energy absorbing material) should be present that extend in the transverse direction and are welded to second yarns extending in the longitudinal direction. In order to achieve particularly high seam strength there, the first yarns should be present in a higher concentration in the seam region than in the remaining region of the forming fabric, and the first and second fabrics (sic) should be welded to one another at as many intersection points as possible. The longitudinal yarns inserted in correctly woven fashion into the respectively opposite end during the stitching process are then fused to the first yarns. This creates the possibility of shortening the seam region without thereby impairing the strength of the seam. In this fashion the seam region can be reduced from a usual extension of, for example, 100 mm in the longitudinal region to, for example, 60 mm, i.e. the seam region can be shortened by 20-60% in the machine direction.

However, an apparent major shortcoming of this approach is that the other properties of the seam such as its permeability, number of sheet support points, and Fiber Support Index (FSI) will be different from the main fabric body as the end counts in the CD will be different.

Thus, the fusing or welding of synthetic polymeric yarns by focused laser energy, especially those in the seam area of woven fabrics, without causing appreciable loss of yarn properties; major alteration of size and/or shape of the yarns; having a seam that has properties like the body of the fabric; that the seam has, if the seam is the same length in the MD as normally used, higher durability, and strength equal to or higher than an unfused or unwelded seam; and if the seam is shorter in the MD than normally used, strength sufficient to allow the fabric to run a useful life when installed and used on a paper or other industrial machine, is the subject of the present invention.

SUMMARY OF THE INVENTION

Surprisingly, the deficiencies of the art are overcome by the objects of the invention which are described below:

One object of the invention is to provide an improved seam for a papermaker or other industrial fabric or belt.

Another object is to provide an improved seam for a papermaker or other industrial fabric or belt that has properties such as strength, durability, openness, adequate number of support points, and FSI essentially the same as the fabric body.

Another object of the invention is to provide an improved seam in a fabric that has minimal terminal yarn end pullback and seam end termination wear.

Another object of the invention is to provide a seam for woven structures from yarns which allows creation of said woven structure and seam which would not have adequate strength using conventional seaming methods.

Another object of the invention is to enable fabric designs that have not been commercialized due to the inability to make seams with adequate strength using conventional seaming technology.

Another object of the invention is to provide appropriate materials in desired locations which will act as laser energy absorbers.

Another object of the invention is to provide a process for applying the appropriate laser energy absorbing materials in the desired locations.

Another object of the invention is to form a fabric having a durable seam, wherein the seam width as measured in the MD is a fraction of the width of a normal seam or a seam that is formed using a conventional technique of equal strength. This fraction can be 0.7 or lower, preferably 0.5 or lower, and most preferably 0.3 or lower. For example, if "X" is the width of a seam in MD according to prior practice, or a conventional seaming method, then the width of the seam formed according to the instant invention is, for example, 0.7X or lower, preferably 0.5X or lower, and most preferably 0.3X or lower whilst being of equal strength.

Another object of the invention is to provide seams which contain yarns which are grooved to further improve fusion/bonding for increased seam strength.

BRIEF DESCRIPTION OF THE DRAWINGS

The present invention will now be described in more complete detail with references being made to the figures wherein like reference numerals denote like elements and parts, which are identified below:

FIG. 3 is a picture of a forming fabric, and its seam area, prepared using an embodiment of the invention;

FIG. 4 (a)-(e) are SEM of yarns usually in an area of the fabric that have been laser microwelded;

FIG. 13(a)-(c) show a monofilament, a welded braided structure, and a crossover point in the welded braided structure, according to one embodiment of the invention.

DETAILED DESCRIPTION OF THE INVENTION

Figure 1:
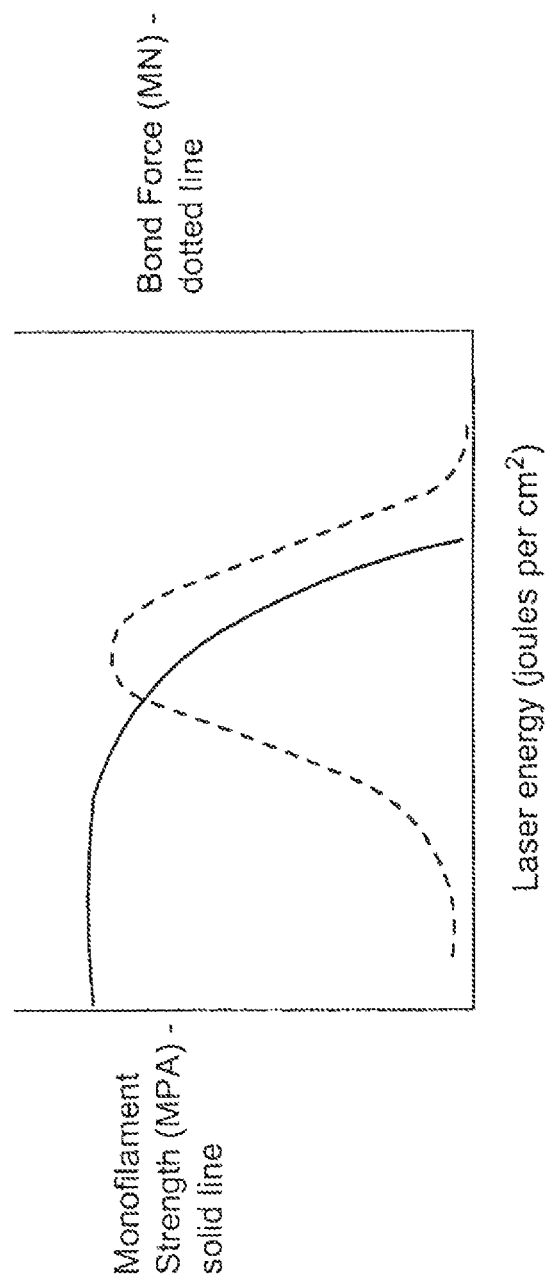
FIG. 1 is a graph exemplifying the effect of the amount of laser energy absorbed on the strength of a polymeric monofilament yarn, and also on the bond strength of two polymeric monofilaments fused together.

The present invention relates to improving seams in paper machine and other industrial fabrics by utilizing laser energy. The present invention, specifically, relates to belts used in the forming, pressing, and drying sections of a paper machine, and to industrial process fabrics and belts, TAD fabrics, engineered fabrics and corrugator belts. In one aspect of the invention there is a need to make a stronger and/or more durable seam. In another aspect, there is a need to provide seams with adequate strength that are shorter in the MD than would commonly be used. Another aspect is to be able to provide woven fabric structures that heretofore could not be produced due to the inability to provide adequate seam strength using conventional seaming technology.

The present invention also relates to the fabric produced using such an improved seam.

The present invention also relates to a process for producing such an improved seam and fabric.

While most of the discussion will be for seams for flat woven fabrics, other types of seams, such as for example the commonly known pin seam or inline spiral seam, which also requires reweaving of MD yarns into the fabric body and has the potential therefore to fail due to yarn slippage and pull out, can also be improved by the laser welding technique described herein. In such seams, the MD yarns which form the seam loops themselves can be welded or fused to the CD yarns to prevent them from pulling out under operating tensions in use.

Various different methods are envisioned to produce these seams. One method is to focus the laser in discrete locations such as at seam termination points in the fabric seam. The presence of an absorbing material at each location may be necessary as most polymeric materials do not absorb laser energy. Otherwise, the laser energy may cause over-melting and/or loss of molecular orientation where the laser energy is focused on the yarns in the fabric.

One method to incorporate the absorber is to have it be part of the polymer resin used during extrusion of the yarn itself. Then the laser can be focused at each desired discrete location causing local fusion and welding.

Another method to incorporate the absorber is to coat the yarns with the absorbing material prior to weaving them into the fabric. In this case, the laser energy absorbing material, for example a particular dye, is applied by dye coating on the yarns before being woven into the fabric or sprayed on in a controlled precise pattern after the fabric is woven and seamed. In a subsequent operation, the laser is focused at each desired location, thus, causing local fusion.

Another method to incorporate the absorbing material is to apply it to the desired discrete locations in the fabric. A method for applying resin material in discrete locations is taught in commonly assigned U.S. Publication No. 2004/0126569, wherein the laser energy absorbing material can be deposited onto the fabric in a controlled manner so as to create a predetermined pattern of deposits.

Another method is to spray the absorbing material in CD bands in desired locations, for example, the seam area, of a woven, seamed fabric.

The basic principle of the use of a laser energy absorbing material is to provide a means for the energy source to heat the surfaces of the yarns in desired locations without appreciable heating of the yarn core. In this way it is possible to heat the yarn surfaces such that the surfaces can be fused to another yarn without melting the entire yarn cross-section. Two neighboring yarns in a seam area 10 of a woven, seamed fabric, for example a CD yarn 14 and an MD yarn 20, as shown in FIG. 3, that have a laser energy absorbing material on their surfaces and that are in contact with each other will fuse or weld together when the yarns are exposed to a properly controlled laser source. If too much energy is supplied by the laser, the yarns will either destructively melt or vaporize. If too little energy is supplied, the fiber surfaces will not get hot enough to melt and fuse together. When the proper amount of energy is supplied, the yarns will fuse together without the yarns losing substantial strength.

FIG. 4(a) is an SEM photo of a multilayer forming fabric that was coated in one section with a laser energy absorbing material that was dispersed in a solvent. After the solvent had dried, the fabric was exposed to a YAG laser for a 1 millisecond pulse at 225 volts. The diameter of the focused beam of the laser was around 300 microns. This single pulse produced multiple welds throughout the structure in and around the area of the laser beam. Microwelds are clearly formed between machine direction and cross machine direction monofilaments. The monofilaments in this photo are comprised of polyethylene terephtholate (PET).

FIG. 4(b) shows a fabric where the pulse length was increased to 1.1 milliseconds. Note the damage 28 resulting from the increased pulse length.

Figure 14A:
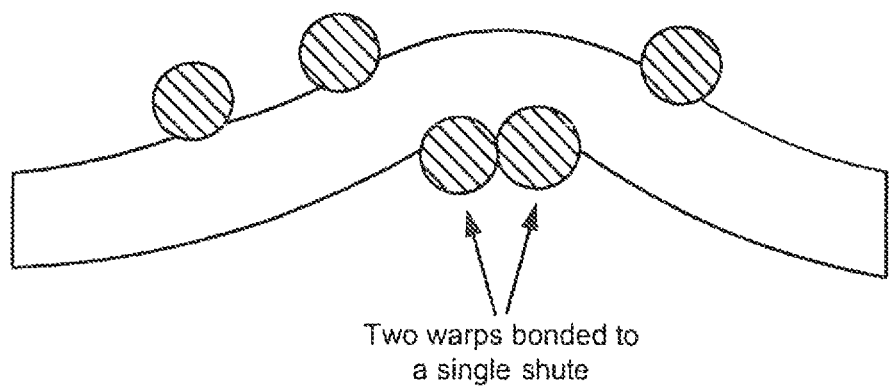
FIG. 14(a)-(b) are cross sectional views of a welded fabric, according to one embodiment of the invention.
Figure 14B:
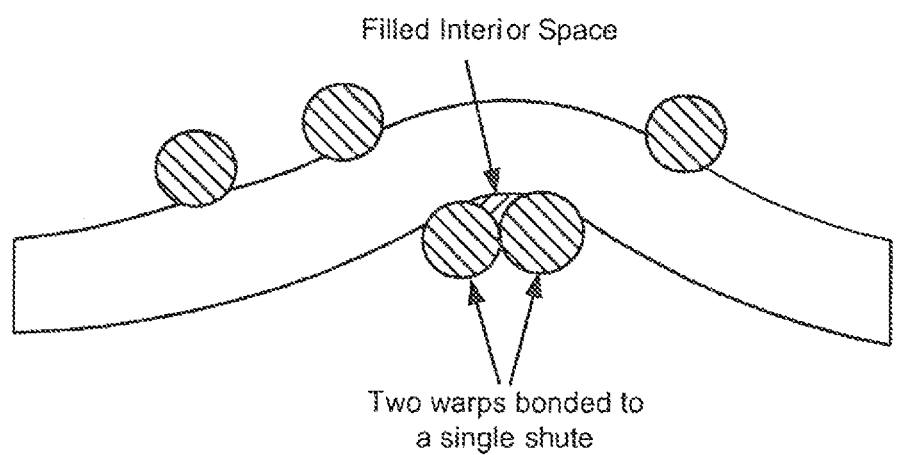

FIG. 4(c) shows a third sample that was made in a similar fashion as the first sample except that the top and bottom surfaces of the coated fabrics were wiped with a cloth that had been moistened with acetone. This wiping action removed much of the laser energy absorbing material from the top and bottom surfaces of the fabric sample. The result is internal welding of the yarns in the structure and little melting at the external surfaces of the fabric. A cross-sectional view of such a weld is shown in FIGS. 14(a) and 14(b), where internal welding can be seen within the structure and little melting or welding at the external surfaces of the fabric.

In one embodiment of the invention, this technique was applied to a braided structure 100 comprised of grooved PET monofilament 50. The braided structure 100 was formed on a piece of polyolefin tubing measuring 6 mm in diameter. The cross section of the grooved PET monofilament 50 is shown in FIG. 13(*a*).

This grooved PET monofilament has a nominal diameter of 9.27 mm. The grooves in the monofilament allow laser dye to access the area between two monofilaments that are crossed over one another in the braided structure 100. This crossover is very much like the crossover that occurs in woven fabrics. In common textile structures made from monofilaments, the monofilaments are typically round or rectangular in cross section without any grooves (smooth surfaced). Grooved monofilaments are used as a means to capture laser energy absorbing material. Smooth surfaced monofilaments have less area and surface volume to capture coatings. In addition, when smooth surface monofilaments are used in a crossover textile design, for example a woven fabric, there is little or no free space between two smooth surfaced monofilaments and it is unlikely that the laser energy absorbing material, for example a particular dye, will penetrate the area between the monofilaments. By contrast, any dye applied to the crossover between two grooved monofilaments, or a grooved monofilament and a smooth surfaced monofilament, is likely to penetrate the area between the monofilaments due to flow of the coating along the grooves occupying the space between the monofilaments. Thus, using grooved monofilaments one is able to place laser dye in the space between two crossing over monofilaments.

As noted above, this technique was applied to a braided structure 100 comprised of grooved monofilaments 50 as shown in FIG. 13(*b*). After laser welding, the crossovers 60 in the structure were found to be welded securely (shown in FIG. 13(*c*)). Flexing the structure by compression and elongation of the braid along its axis did not result in the failure of any welds. By comparison a similar braided structure was prepared using smooth surfaced PET monofilament. The welded structure was also subjected to compression and elongation along its axis. As a result of this compression and elongation, many bonds broke at the crossovers. It was observed from these weld failures that grooved monofilaments can be used to form micro-welds that are more durable than the micro-welds formed with smooth surfaced monofilament.

The types of micro-welding described above can also be used to increase the strength and/or durability of, for example, forming fabric seams. Conventional seams rely on fiber/yarn crimp and friction to hold the seam together. By welding together machine direction and cross machine direction monofilaments in such seams, it is possible to increase the strength and/or durability of the seams.

This type of micro-welding can also enable new fabric designs to be commercialized. In the past, fabric weave designs having so-called "straight warps" have been considered. Designs that have straight warps are problematic as the MD yarns in the seam lack sufficient crimp and friction that are needed to hold the seam together. Otherwise straight warp designs are very attractive as they enable fabric designs that have improved tensile modulus relative to conventional forming fabric designs that have crimped machine direction monofilaments with sufficient crimp to form a strong seam. Another example is the "straight line" concept that involves straight warps residing in the middle of a multi-layer fabric. The warps have insufficient crimp and friction for making a seam. By utilizing the micro-welds described herein, one can enable seams to be made with straight warp fabric designs. Micro-welds between machine direction and cross machine direction monofilaments enable stresses to be transferred around and across a termination in the seam of the fabric structure. Other designs utilizing very fine yarns in either the MD or CD, or designs that use yarn counts that are relatively low (meaning coarse fabrics), may not have adequate seam strength unless the seam is enhanced by laser micro-welds.

As stated above, another approach to making micro-welds also utilizes a laser dye or laser pigment. In this case the laser dye or laser pigment is dispersed in the material comprising the monofilament. Typically, the concentration of the laser dye or laser pigment is less than 0.4%. The presence of the laser dye or laser pigment allows one to make an "energy absorbing" monofilament at the frequency of the energy source. Preferably, a laser energy source is used as lasers are designed to deliver precise amounts of energy to specific locations. FIG. 4(*d*) shows a polyester monofilament 14 containing 0.3% of a laser dye (Epolight 2057 from Epolin, Inc.) that has been bonded to a "non-absorbing" polyester monofilament 20. The two monofilaments were laid in contact with each other at 90 degrees. The crossover of the two monofilaments was exposed to a YAG laser for a 1 millisecond pulse at 223 volts. The diameter of the focused beam of the laser was about 300 microns. This single pulse welded the two monofilaments together. The "non-absorbing" monofilament 20 was made without any laser dye or pigment so that the monofilament would be non-absorbing at the frequency of the energy source.

In another case a CD PET monofilament 14 containing 0.4% of a laser absorber was woven into a fabric as a wear side monofilament. All of the other monofilaments in the fabric were comprised of "non-absorbing" PET monofilaments 20. A 300 micron diameter area of the fabric was exposed for 1 millisecond to a YAG laser operating at 225 volts. The area that was exposed was the crossover between the CD monofilament and two machine direction monofilaments. As shown in FIG. 4(*e*) the CD monofilament 14 fused and bonded to the machine direction monofilaments 20.

Figures 2A, 2B, 2C, 2D:
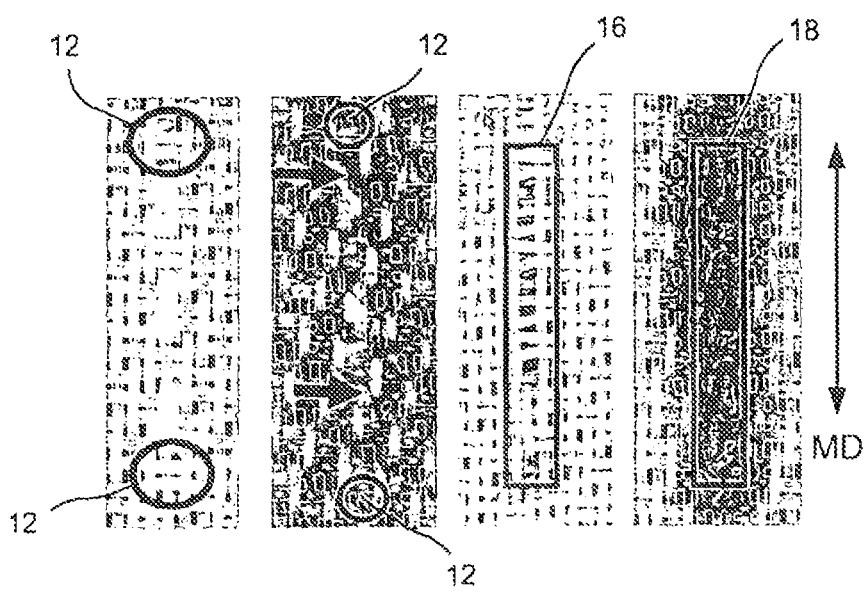
FIGS. 2 (a)-(d) depict one of the problems associated with conventional woven seam formation.

If any of the techniques herein described above are utilized in the seam area of a woven fabric, problems such as seam terminal end pull back and/or holes in the seam area are virtually eliminated. FIG. 2(*a*)-(*d*) shows this detrimental phenomena, wherein the terminating ends of the two fabric edges are "overlapped" in the seam area and the critical points 12, where these ends might "pullback" in the MD and the ends themselves might protrude through the paperside surface, are identified (FIG. 2(*a*)). Eventually the slippage in the overlapping area increases as shown by the arrows due to increased localized stresses in the fabric (FIG. 2(*b*)) and there is a complete slippage and a hole 16 appears in the overlap region of the seam area of the fabric (FIG. 2(*c*)). Accordingly, the overlap region of the seam is typically reinforced by manually gluing 18 (FIG. 2(*d*)) to increase its strength; however, gluing is a laborious and time consuming process. Due to its low precision it is also hard to limit the glue to only the overlapping yarns. In addition, the glue eventually fails either due to flexing of the fabric and/or abrasion.

Many choices exist for laser energy absorbing materials. The earliest example was carbon black. The choice of material, the quantity of material, and the location of the material, all determine the resultant characteristic of the fused bond.

As mentioned above, the melting of the yarn occurs on any surface that has been coated with a laser energy absorbing material and then exposed to the appropriate laser energy source.

In order to control the area or extent of the melting, it has been found beneficial to use certain dyes that are water soluble.

When such a dye is applied to a fabric from an aqueous solution and allowed to dry, the dye migrates to the interstices between monofilaments in contact with each other. This is in contrast to other laser dyes which are only soluble in organic solvents. These non-aqueous dyes deposit on the entire surface of the monofilament and cause melting of the entire surface of the monofilament.

Figure 5A:
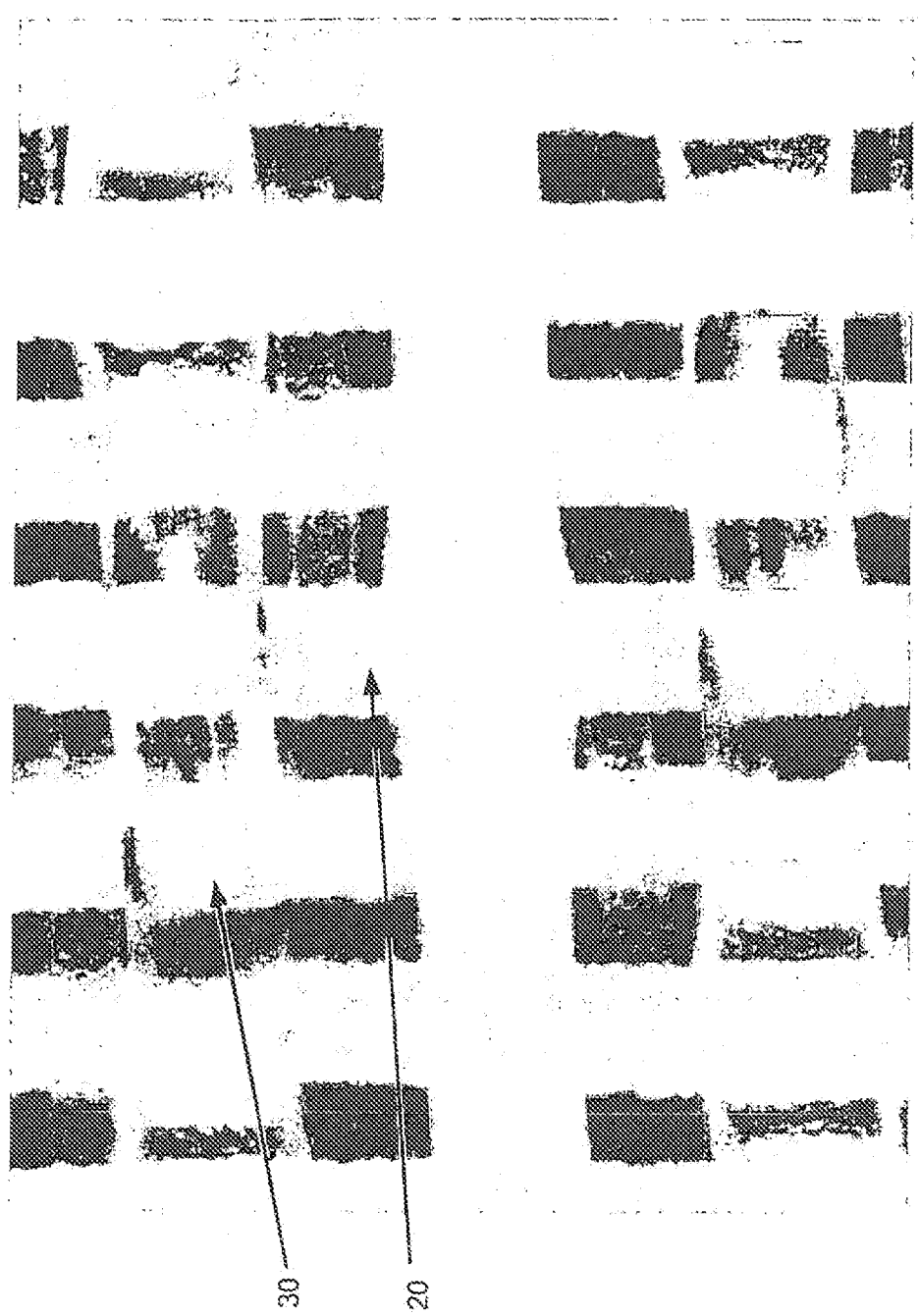
FIGS. 5 (a) and (b) are photos of yarns comparing the effect of nonaqueous and aqueous laser dyes.

FIG. 5(a) illustrates what happens with a non-aqueous laser dye. Note that the entire surface of the monofilament 20 has been melted after exposure to laser energy. This can be observed by the mottled surface of the monofilament 20 versus the smooth, shiny surface of an unmelted monofilament 30. The dye used in this case was Epolight 2057 applied from an acetone solution.

Figure 5B:
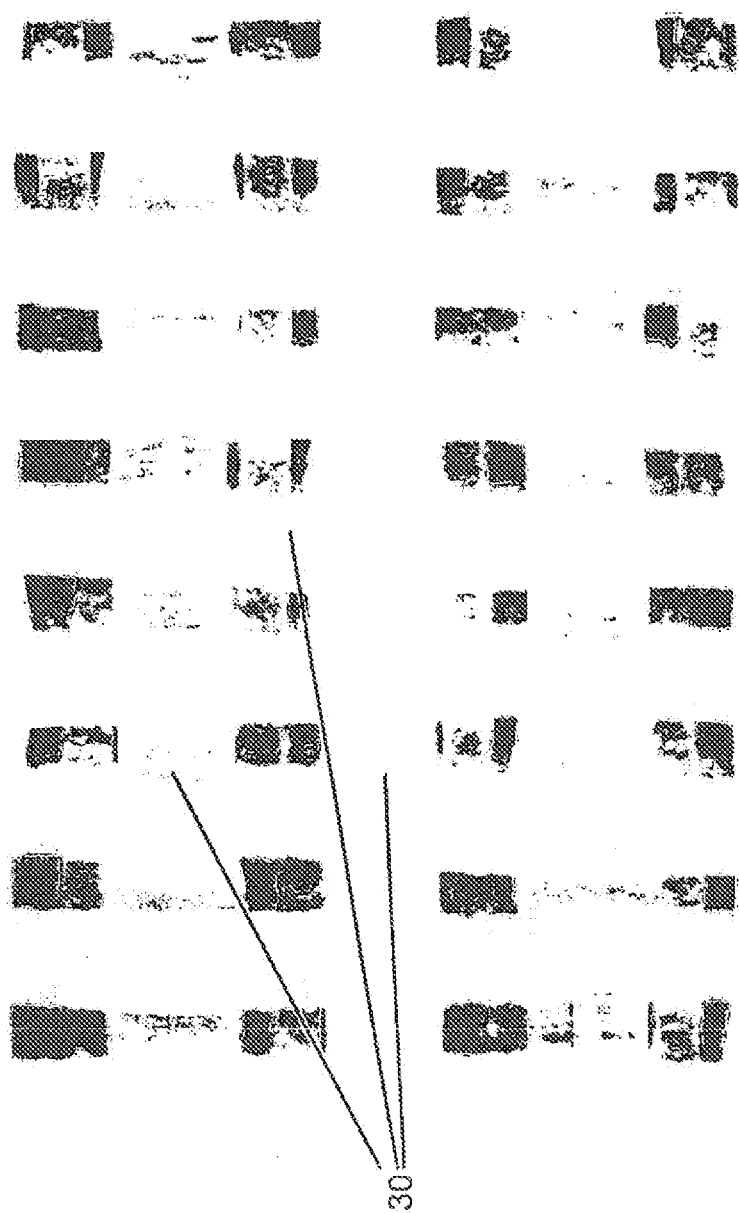

FIG. 5(b) illustrates what happens with an aqueous laser dye (Epolight E2340). Note that the surface of the monofilament 20 is smooth and shiny, while the interstices between monofilaments contain laser dye and are bonded after exposure to laser energy. This result is a significant and unexpected improvement over non-aqueous laser dyes. With respect to forming fabric seams the reduced melting of the monofilament with an aqueous laser dye produces less distortion in the seam area which in turn reduces any potential sheet marking resulting from laser welding.

However, it is a matter of choice which type of dye to use. For example, filled crossover points between MD and CD yarns are advocated for, for example, forming and TAD fabrics, as the filled crossovers caused by material flow during fusion, reduce the amount of water that would normally reside there due to capillary forces. Reduced water carrying reduces energy cost in paper production. Filled crossovers are also advocated to reduce the accumulation of dirt in the pinch point between the crossovers formed by the MD and CD yarns.

Clearly, a laser welded seam is superior in strength and dimensional stability to a conventional production seam. While this technology enables stronger seams, this technology also enables new features to be produced with conventional forming fabric patterns. This is accomplished by the impact of welded seam technology on standard heatsetting practices. Conventional practices of heatsetting are limited due to a trade-off between dimensional stability and seam strength. If one uses harsh heatsetting conditions that result in a large amount of fabric stretch (crimp removal in the MD monofilaments), the resulting product will have low seam strength, but high dimensional stability. Typically harsh heatsetting conditions are not used as they result in a seam strength that is too low. With laser welded seam technology, heatsetting conditions that are harsher can be used, as the normally low seam strength is compensated for by the welded seam strength. This means that the resulting structure will have better dimensional stability than conventional fabrics. This also means that more plane difference will result between the MD and CD monofilaments. This is an advantage in the wear side as this allows one to increase resistance to fabric wear characteristics without resorting to the use of large diameter monofilaments. In turn this keeps the fabric caliper low and for example, reduces water carrying by the forming fabric.

As mentioned above, various methods have been considered to microweld either crossover points in woven structures, or contacting points between adjacent yarns in woven structures via laser welding or fusing.

Welds make it possible to transfer machine direction stress around or across the terminations in the seam area without the integrity of the seam being dependent only upon yarn friction and crimp in the seam area. Welds have been made in various patterns including complete (100%) welding of the entire seam area, regular arrays of spot welds, and groups of CD weld stripes. A combination of these welds can also be formed e.g., a combination of spot welds and a group of CD weld stripes. The mechanical properties of, for example, a forming fabric seam area must allow for skew due to misaligned rolls on a paper machine. In this respect the seam must be capable of handling shear forces in the plane of the fabric without causing problems such as buckling or wrinkling of the fabric during use in the papermaking process. Seam areas which are welded in their entirety (100% welded in the seam) are stiff and highly resistant to in-plane shear deformation.

An ideal welding pattern for, as an example, a forming fabric seam accomplishes two goals. First, the pattern ensures that each and every terminal warp monofilament terminal end in the fabric seam is welded to a shute monofilament such that machine direction stress can be transferred via welds and continuous monofilament around matching or corresponding terminal warp ends in the seam. As an alternative, multiple welds can be produced along the length of a single yarn, such as a warp or weft with the wefts and warps crossing over, respectively, thereby sharing the same load with a number of wefts or warps at the crossover points, thus eliminating any distortion in the fabric. These welds produce a seam that is very durable on a paper machine. Second, the pattern ensures that there are contiguous paths of unwelded warps and shutes extending from one side of the seam to the other side of the seam in the machine direction. These contiguous paths of unwelded fabric enable the in-plane shear properties of the seam to be similar to the in-plane shear properties of the body of the fabric. This feature enables the fabric including the seam to successfully manage a maldistribution of stresses that can arise from misaligned rolls on a paper machine. If the fabric cannot manage a maldistribution in stresses, the fabric will buckle or wrinkle on the paper machine.

Preferably the contiguous paths of unwelded warps are symmetric with respect to the machine direction. This feature ensures that the in-plane shear properties are symmetric with respect to the machine direction.

Figure 6A:
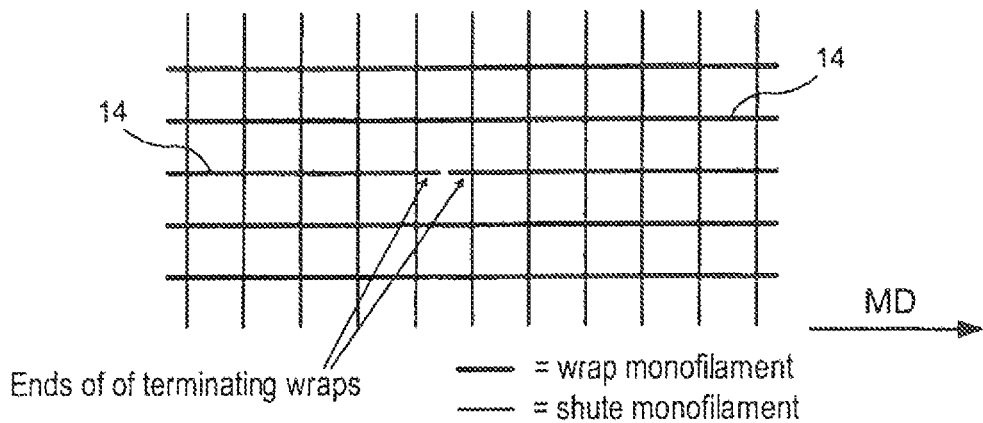
FIGS. 6(a)-(d) depict a same seam termination pair, and also, showing how stress is distributed through the seam to adjacent MD yarns as they crossover or under the bordering CD monofilament yarns.

The following is intended to explain the pattern in greater detail. Stress transfer in welded seams assumes that every terminal end must be welded at some place along its length (preferably at or near each termination) in order for machine direction stress to be transferred around each termination via welds and continuous monofilament in the fabric. While stress transfer in a conventional woven seam makes use of monofilament crimp and friction between warp and shute monofilaments, this type of stress transfer is ignored. FIG. 6(a) shows a single termination of two warp ends 14, and FIG. 6(b) shows two spot welds on either side of this termination.

Figure 6B:
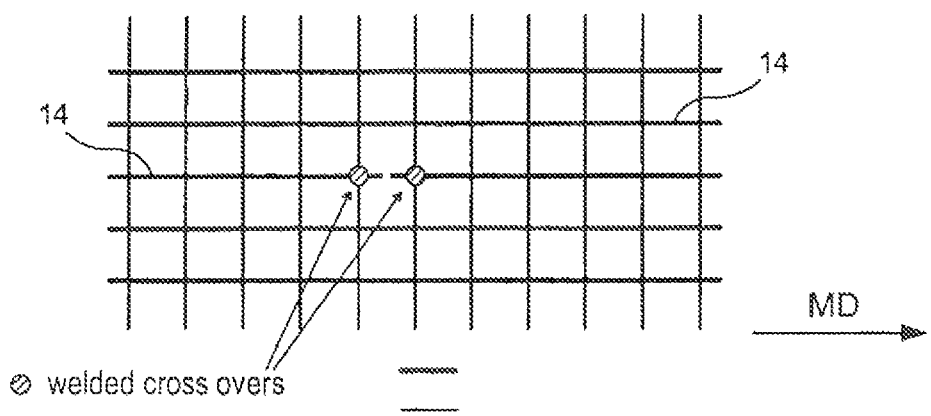
Figure 6C:
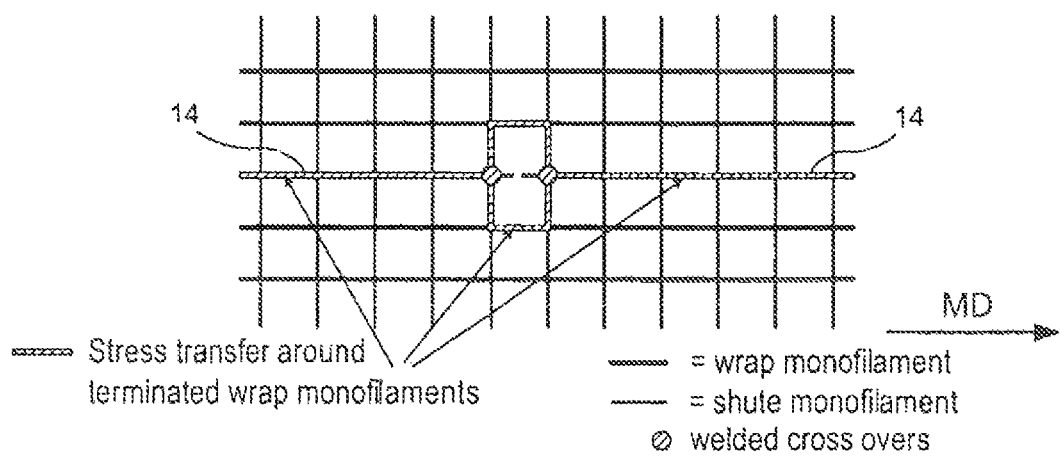

FIG. 6(c) illustrates the shortest paths by which stress is transferred around or across this termination. Each path is defined by a combination of continuous monofilament and welds which bond monofilaments together. In FIG. 6(c) note that there are two paths of equal length.

Figure 6D:
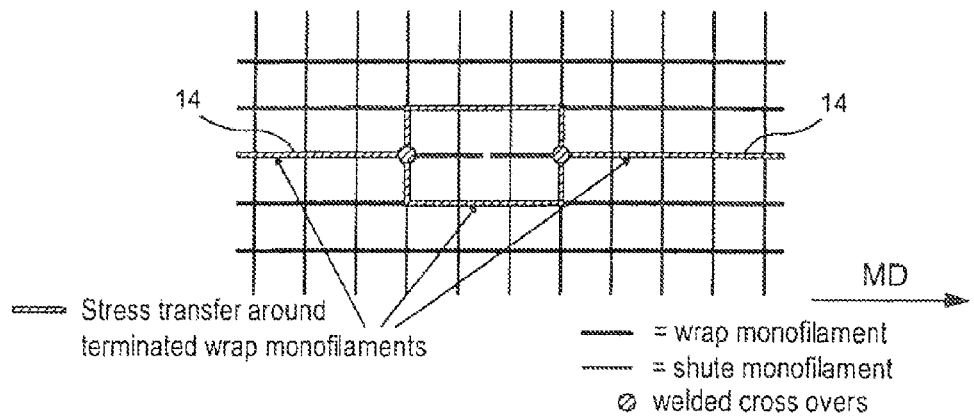

An alternative to the location of the spot welds shown in FIG. 6(b) is shown in FIG. 6(d). In this diagram, the spot welds are further away from the actual termination. The shortest paths for transferring stress around the termination are illustrated in FIG. 6(d). The logic for stress transfer as illustrated in the above diagrams can be applied to any spot weld pattern. Successful stress transfer around a termination will result as long as there is a continuous path from one side of the seam to the other side of the seam with this path consisting of continuous monofilaments and spot welds that connect warp and weft monofilaments.

Figure 7A:
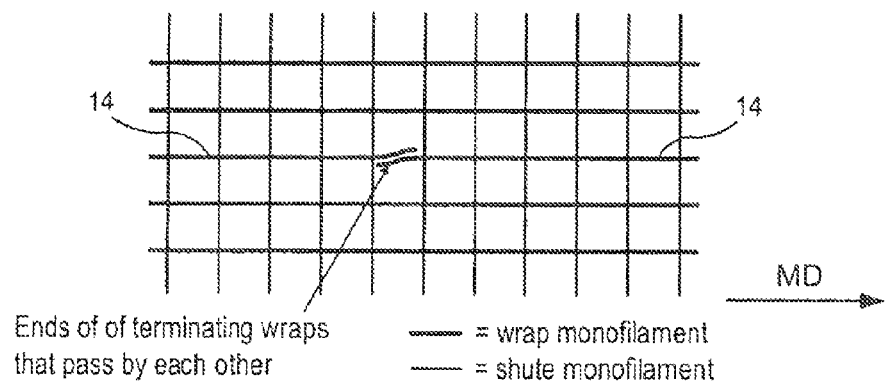
FIGS. 7(a)-(c) show a seam termination consisting two warp ends and also, showing how stress is distributed on either side.
Figure 7B:
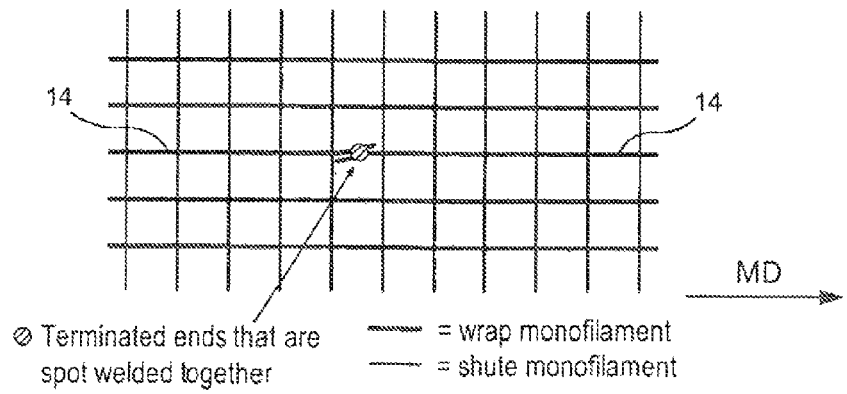
Figure 7C:
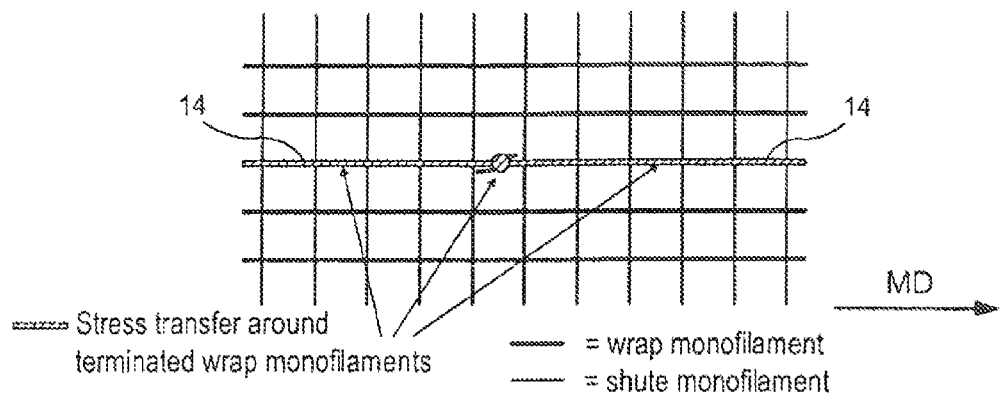

Alternatively, a termination can consist of two warp ends 14 that pass by each other as illustrated in FIG. 7(*a*). While this termination can be welded in a way identical to that shown in FIG. 6(*b*) or FIG. 6(*d*), it is possible to also weld the two warp ends 14 together as illustrated in FIG. 7(*b*). In this case, stress can be transferred in a direct path from one warp monofilament to another warp monofilament 14 as shown in FIG. 7(*c*).

Figure 8:
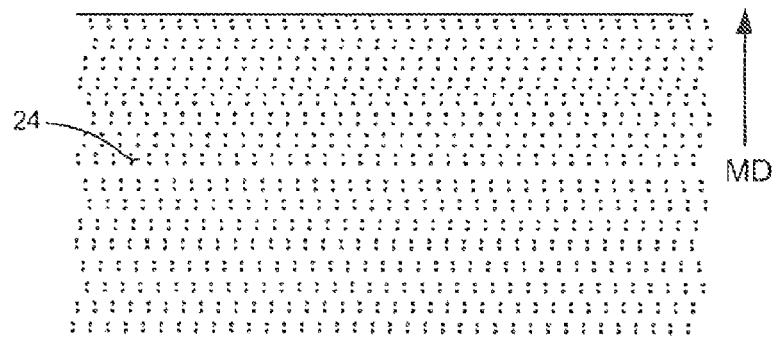
FIG. 8 is a stylized depiction of the MD and CD yarns in a seam area, the dots representing where the yarn end terminations are located.

According to one embodiment of the invention, FIG. 8 shows the pattern 24 of terminations for a support shute binder ("SSB") forming fabric, according to one embodiment of the invention. The vertical direction in this diagram is the same as the machine direction. Each dot in the diagram represents a single terminal warp end. Note that the pattern is regular and that the terminations are spread out over a large area. In the machine direction the seam length measures about 3 inches. The two sides of the seam are designated by the dotted lines at the top and bottom of FIG. 8.

Figure 9:
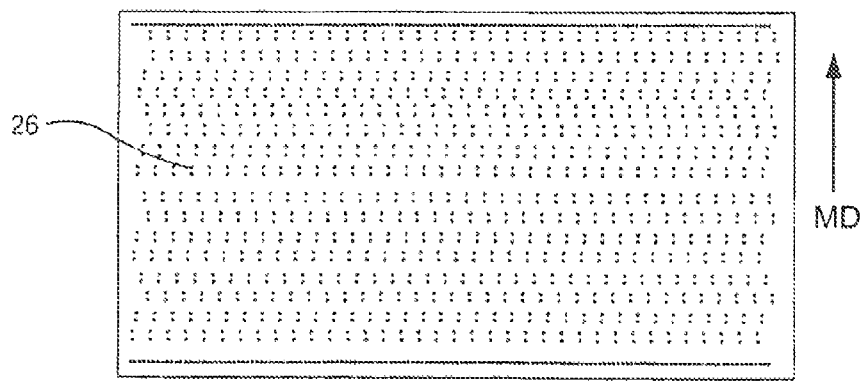
FIG. 9 depicts 100% welding according to one embodiment of the invention.

In the seam of FIG. 8 welds can be made by complete (100%) welding 26 of the seam area, arrays of spot welds, and groups of CD weld stripes. Each of these is described below. The first to be shown is 100% welding 26 in FIG. 9. Clearly, this weld pattern does not provide any contiguous path of unwelded warps and shutes extending from one side of the seam to the other side of the seam in the machine direction. This pattern stiffens the fabric resulting in increased in-plane shear stiffness and a reduced ability of the fabric to resist buckling or wrinkling while running on a paper machine. However, the weld pattern does ensure that each and every terminal warp monofilament in the seam is welded to a shute monofilament such that machine direction stress can be transferred via welds and continuous monofilament around matching or corresponding terminal warp ends in the seam. This makes the seam very durable.

Figure 10:
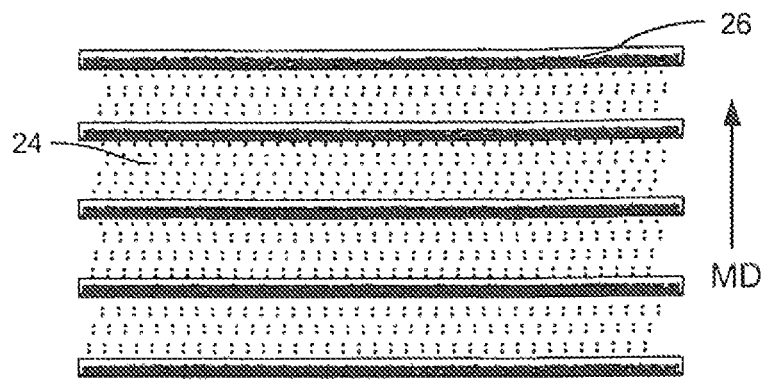
FIG. 10 shows a group of CD weld stripes, according to one aspect of the invention.

The next figure, FIG. 10 shows groups of CD weld stripes 26. While this weld pattern does not provide any contiguous path of unwelded warps and shutes extending from one side of the seam to the other side of the seam in the machine direction the weld pattern does ensure that each and every terminal warp monofilament in the seam is welded to a shute monofilament such that machine direction stress can be transferred via welds and continuous monofilament around matching or corresponding terminal warp ends in the seam. It is to be noted, however, that the unfused stripes between the welded stripes are capable of skewing or managing distortion of the fabric to some extent. Experiments have shown that a pattern such as this is an excellent balance between desired seam properties and process complexity and cost.

Accordingly, the basic process steps for a fabric with the laser energy absorbing materials in several CD bands are:
1. Seamed, unfinished fabric is prepared;
2. Seam is cleaned;
3. Fabric is loaded into appropriate equipment and tensioned to a specified level;
4. Seam is sprayed with laser dye according to a specific recipe for the design in a controlled manner, and excess dye may be removed;
5. Seam is welded according to a specific recipe for the design;
6. Fabric is cut to width;
7. Edges are finished; and
8. Fabric is packaged and shipped.

Although an order of steps involved in a process for forming a fabric with a laser energy absorbing material in CD bands has been listed above, the order therein is purely exemplary, and does not limit the scope of the invention.

Figure 11:
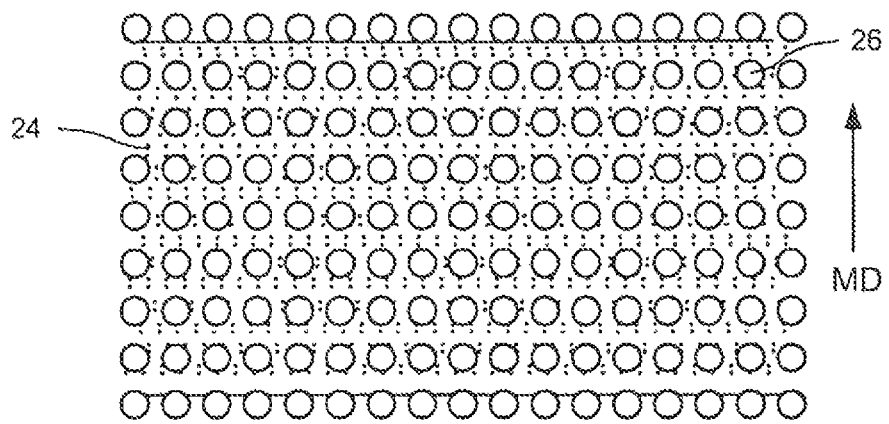
FIG. 11 shows a group of spot welds, according to one aspect of the invention.

As mentioned previously, however, spot welding of individual locations can be utilized. The next figure, FIG. 11 shows a group of spot welds 26. This weld pattern does provide for a contiguous path of unwelded warps and shutes extending from one side of the seam to the other side of the seam in the machine direction. This pattern stiffens the fabric locally where the spot welds reside. These locally stiff welds do not greatly increase the in-plane shear stiffness in the seam area. As a result, this seam design is best able to resist buckling or wrinkling while running on a paper machine. However, this particular spot weld pattern does not ensure that each and every terminal warp monofilament in the seam is welded to a shute monofilament such that machine direction stress can be transferred via welds and continuous monofilament around matching or corresponding terminal warp ends in the seam. This happens because the welds are aligned in the machine direction with a space between each machine direction column of welds. As a result, portions of the seam depend upon friction to transfer machine direction stress from one side of the seam to the other. This reduces the durability of the seam.

Figure 12:
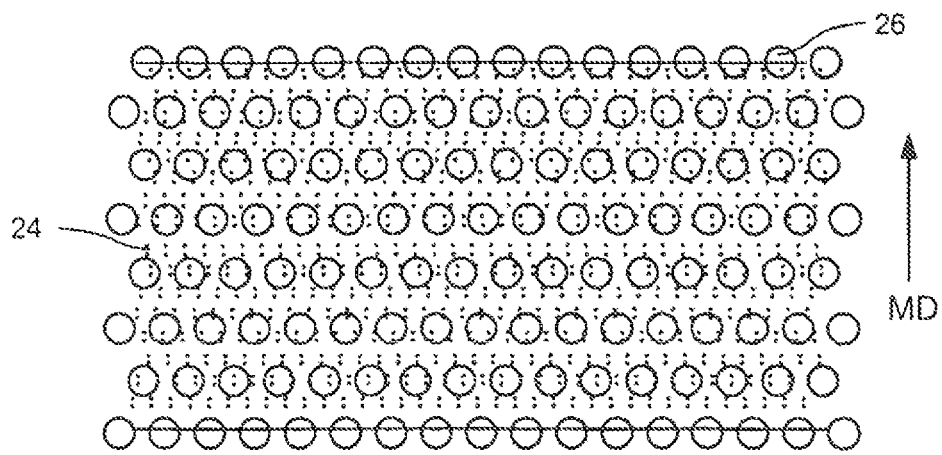
FIG. 12 shows a preferred welding pattern where a contiguous path of unwelded fabric is achieved and all of the warp end terminations are welded.

FIG. 12 shows a preferred welding pattern 26 where a contiguous path of unwelded warps is achieved and all of the warp end terminations are welded. This pattern achieves the desired combination of in-plane shear properties and seam durability. Each and every fabric design and seam pattern would require a stylized and specific spot welding pattern to achieve the desired result.

While spot welding can be achieved by just laser energy itself, a preferred method is to use an absorber for laser energy deposited at the required precise locations which would minimize yarn distortion and loss of molecular orientation of the polymer making up the yarn.

Therefore, a summary of advantages of the present invention can be enlisted as follows:
  Seam strength and durability
  Seam robustness—ability to withstand abrasive conditions such as high pressure showers and abrasive fillers used for example, in paper production
  Shorter seams in the MD
  Allow creation of new fabric structures that can be seamed
  Fabric runs drier in a wet environment such as papermaking
  Broadening process windows, such as heatsetting, to enhance fabric characteristics Therefore, the result of the use of laser welding is a stronger and/or more durable seam for the same length seam in the MD. As an alternative, preferably, the seam width as measured in the MD is a fraction of the width of a normal seam or a seam that is formed using a conventional technique of equal strength. This fraction can be 0.7 or lower, preferably 0.5 or lower, and most preferably 0.3 or lower. For example, if "X" is the width of a seam in MD according to prior practice, of a conventional seaming method, then the width of the seam formed according to the instant invention is, for example, 0.7X or lower, preferably 0.5X or lower, and most preferably 0.3X or lower whilst being of equal strength to the "X" length seam. Although seams for flat woven fabrics have been discussed, the present laser welding technique can be applied to other types of seams, such as for example a pin seam or inline seam, wherein the MD yarns which form the seam loops themselves and are woven back into the fabric body can be welded or fused to the CD yarns to prevent them from pulling out under operating tensions in use, thus improving the seam strength and uniformity in stress or load distribution.

EXAMPLES

Example I

A double layer fabric was woven and seamed with yarns containing a laser energy absorbing material. The fabric seam was exposed to the laser energy source in one area, and left unfused in another area. Samples were then removed of the corresponding seam areas, and breaking strength was measured. A 53% increase in breaking strength was reported.

Example II

Triple layer SSB fabrics of various designs were woven, and the seams had laser energy absorbing material present in desired locations. After exposure to a laser in one area of the seam, samples were removed of unfused and fused seam areas. Seam strength increases of up to 129% were reported.

Example III

In another experiment, a triple layer SSB fabric with a shorter (in the MD) seam that contained laser energy absorbing materials in the yarns was exposed to laser energy in a portion of the seam. Samples of the fused and unfused areas of the seam were tested, and a 47% increase in breaking strength was reported.

Example IV

An SSB fabric was woven and seamed that had laser energy absorbing materials present in desired locations in the seam area. The seam was exposed to the appropriate laser energy source. The fabric was then run on a pilot machine on the conveying position of a gap forming machine making 45 gsm newsprint at 800 mpm. Trial conditions such as fabric tension, counter blade loading, and vacuum levels were varied. No sheet drainage mark from the seam was detected under the entire range of conditions employed.

Thus the present invention, its objects, and advantages, are realized and although preferred embodiments have been disclosed and described in detail herein, its scope and objects should not be limited thereby; rather its scope should be determined by that of the appended claims.

The invention claimed is:

1. A method for welding a portion of an industrial fabric comprising the steps of:
   (a) providing said fabric with a laser energy absorbing material which is applied to said fabric in a controlled manner, and
   (b) focusing a laser source at discrete locations on said fabric, wherein said discrete locations are in a seam area of the fabric and wherein a width of the seam area as measured in MD is a fraction of a width of a normal seam or a seam formed using conventional techniques of equal strength, said fraction being 0.7 or lower; thereby partially melting and permanently welding the fabric at said discrete locations.

2. The method of claim 1, wherein said discrete locations are either yarn crossovers or seam termination points in the seam area of the fabric, or a combination of both.

3. The method of claim 2, wherein said laser energy absorbing material is deposited onto said fabric in a controlled manner so as to create a predetermined pattern of deposits.

4. The method of claim 2, wherein said laser energy absorbing material is included in a polymer matrix forming a yarn used to form the industrial fabric.

5. The method of claim 2, wherein said laser energy absorbing material is a coating applied on yarns forming the fabric.

6. The method of claim 5, wherein said coating is applied by dye coating on said yarns before being woven into the fabric or sprayed on in a controlled precise pattern after the fabric is woven and seamed.

7. The method of claim 3, wherein said laser energy absorbing material is applied in a pattern such that not every seam termination point is covered.

8. The method of claim 1, wherein said welding is carried out as bands in a cross machine direction of the fabric.

9. The method of claim 1, wherein said laser energy absorbing material is an aqueous based dye.

10. The method of claim 1, wherein said laser energy absorbing material is a solvent based or aqueous based dye to achieve a textured or smooth surface on the yarns during welding respectively.

11. The method of claim 4, wherein said laser energy absorbing material is applied in a pattern such that not every seam termination point is covered.

12. The method of claim 5, wherein said laser energy absorbing material is applied in a pattern such that not every seam termination point is covered.

13. The method of claim 1, wherein said fraction being 0.5 or lower.

14. The method of claim 1, wherein said fraction being 0.3 or lower.

* * * * *